Sept. 8, 1964    J. T. RICHMOND    3,148,027
VAPOR PHASE PROCESS FOR PRODUCING METAL OXIDES
Filed Feb. 20, 1961    2 Sheets-Sheet 2

INVENTOR
J. T. Richmond
BY
ATTORNEYS

United States Patent Office 3,148,027
Patented Sept. 8, 1964

3,148,027
VAPOR PHASE PROCESS FOR PRODUCING METAL OXIDES
James Thomson Richmond, Luton, England, assignor to Laporte Titanium Limited, London, England, a British company
Filed Feb. 20, 1961, Ser. No. 90,281
7 Claims. (Cl. 23—202)

This invention relates to the manufacture of oxides of the elements titanium, zirconium, aluminium and silicon by reacting chlorides of the elements with an oxidizing gas.

It has previously been proposed to manufacture titanium dioxide by reacting a titanium tetrahalide vapor with an oxidizing gas in a fluidized bed of refractory particles, but, as is disclosed in British patent specifiication No. 866,363, some of the titanium dioxide produced forms a deposit on the particles of the bed. Thus the particles forming the bed tend to grow in size until the bed can no longer be maintained in a fluidized condition. This particle growth also occurs in the manufacture of the oxide of the other elements referred to above by this type of process.

This invention provides a process for the manufacture of an oxide of one of the elements titanium, zirconium, aluminium and silicon by reacting a chloride of the element with an oxidizing gas in the vapor phase, wherein the reaction is carried out within a bed of particles of an oxide of one of the said elements, or of a mixture of more than one of the said elements, maintained in a fluidized condition at a temperature within the range of from 750° C. to 1,500° C., a part of the oxide produced remains in the bed and the size distribution of the oxide particles forming the bed is controlled by withdrawing oxide particles from the oxidation zone, reacting the withdrawn particles with a chlorinating and reducing agent to reduce their size and to form the said chloride, and removing particles of reduced size from the chlorination zone by allowing them to become entrained in the gas stream leaving the chlorination zone by reason of their decrease in size and introducing the oxide particles of reduced size and the chloride vapor into the oxidation zone.

In this process, oxide deposited on the particles forming the bed is converted back to the chloride, in a chlorination zone and the chloride so formed is then returned to the oxidation zone where it again undergoes reaction to form the oxide, of which a part will become entrained in the gas stream leaving the bed. It is thus possible to arrange that ultimately substantially all the chloride is converted into a finely divided form of oxide that is carried out of the bed in the gas stream and has pigmentary properties.

The oxidation and chlorination zones may be situated in different reactors and the oxide particles may be withdrawn from the oxidation reactor through an outlet situated to serve as an overflow and arranged to define the level of the top of the bed in the oxidation reactor. Instead, the particles may be withdrawn from the oxidation reactor at a controlled rate through an outlet situated below the level of the top of the bed in the oxidation reactor.

Advantageously, the oxide particles are withdrawn from the oxidation zone as they grow larger by allowing them to fall through the bottom of the oxidation zone against the fluidizing gas stream by reason of their greater size.

Advantageously, the oxidation and chlorination zones are different zones of the same reactor. Preferably, the chlorinating and reducing agent is introduced into the reactor substantially at the base thereof, the chloride and the oxidizing gas are introduced into the same reactor at a higher level, the horizontal cross-sectional area of the reactor increases upwardly at and/or above the said higher level, and the rates of feed of substances to the reactor and the dimensions of the reactor are so selected that oxide particles are maintained in the form of a fluidized bed in which the chloride undergoes oxidation in a high zone of the reactor, oxide particles above a certain size fall towards the base of the reactor into a lower zone where they undergo partial chlorination, and the resulting oxide particles of reduced size are carried up into the oxidation zone entrained in the gas stream leaving the chlorination zone. Advantageously, the oxidizing gas is introduced into the reactor through one or more inlets directed tangentially to impart a swirling motion to the oxide particles forming the oxidation bed. If the chloride is fed to the reactor in vapor form, it may be introduced into the reactor through one or more inlets directed tangentially to assist the swirling motion imparted to the oxide particles by the oxidizing gas.

The oxidizing gas may be a gaseous oxidizing compound, for example, an oxide of nitrogen. Advantageously, the oxidizing gas is oxygen, which may be introduced either in pure form or as air.

The chlorinating and reducing agent may be a single gaseous substance, for example, carbonyl chloride, that serves both as a chlorinating agent and as a reducing agent. Advantageously, however, the chlorinating agent is a mixture of a gaseous chlorinating agent, preferably chlorine, and a reducing agent, preferably carbon monoxide. If it is desired to vary the rate of chlorination, it is preferable to do this by varying the rate of supply of the reducing agent while keeping the rate of supply of the chlorinating agent constant.

In the chlorination zone, the oxide particles may be maintained in the form of an agitated or fluidized bed, but when the oxide particles enter the chlorination zone, they may be too large to be fluidized immediately. They become fluidized, however, when their size has been decreased sufficiently by chlorination and they are then maintained in the form of a fluidized bed until, after further chlorination, they are removed from the chlorination zone by entrainment in the gas stream leaving the chlorination zone.

If it is desired to supply additional heat to the oxidation zone, there may be introduced into the oxidation zone a hydrogen-free volatile carbon compound, preferably carbon monoxide, that reacts exothermally with the oxidizing gas.

When the chloride is titanium tetrachloride, a sulphur chloride or a phosphorus chloride or titanium trichloride or a mixture of more than one of these substances may be introduced into the oxidation zone to promote the formation of rutile. The sulphur chloride and the phosphorus chloride can be prepared in the chlorination zone, but it is better to prepare them externally. The titanium trichloride must be prepared externally. In order to prepare titanium dioxide containing alumina as a conditioning agent, aluminium chloride may be introduced into the oxidation zone. The aluminium chloride is advantageously prepared by introducing aluminium or alumina into the chlorination zone. Similarly, in order to prepare titanium dioxide containing silica as a conditioning agent, silicon chloride may be introduced into the oxidation zone. The silicon chloride is advantageously prepared by introducing silicon or silica into the chlorination zone.

The following examples illustrate the invention:

*Example 1*

A bed of titanium dioxide particles contained in a rector was maintained in a fluidized condition by passing oxygen, carbon monoxide and nitrogen upwardly through the bed at the following rates:

| | Pounds per hour |
|---|---|
| Oxygen | 24.8 |
| Carbon monoxide | 3.7 |
| Nitrogen | 8.0 |

At the same time, titanium tetrachloride was fed to the bed, which was at a temperature of 1,210° C., at a rate of 56.0 pounds per hour and reacted with oxygen to form titanium dioxide. Some of the titanium dioxide produced was carried out of the reactor in suspension in the gas stream and some was deposited on the titanium dioxide particles forming the bed.

Titanium dioxide particles, which were found to be of a dense form of titanium dioxide, were withdrawn from this oxidation reactor at a rate of 11 pounds per hour and introduced into a second reactor having an internal diameter of 8 inches. This second reactor was thermally insulated and had a refractory lining. The particles formed a bed in the lower part of the reactor and had the following size distribution on a weight basis:

| | Percent |
|---|---|
| +10 mesh, B.S.S. | 4.6 |
| −10 +22 mesh, B.S.S. | 5.1 |
| −22 +44 mesh, B.S.S. | 45.0 |
| −44 +60 mesh, B.S.S. | 24.7 |
| −60 +72 mesh, B.S.S. | 9.6 |
| −72 +100 mesh, B.S.S. | 5.7 |
| −100 mesh, B.S.S. | 5.3 |

The bed was fluidized by passing carbon monoxide, chlorine and nitrogen upwardly through it at the following rates:

| | Pounds per hour |
|---|---|
| Carbon monoxide | 11.2 |
| Chlorine | 14.9 |
| Nitrogen | 35.0 |

The gas stream from this chlorination reactor was introduced into the oxidation reactor.

When approximately 40 pounds of particles had accumulated in this reactor, the depth of the fluidized bed was kept approximately constant by continuously withdrawing titanium dioxide particles from the bed at a rate of about 3 pounds per hour. The size distribution of these particles gradually changed as a result of the partial chlorination to which they were subjected until, after the process had been running for about 10 hours, it became substantially constant. The following size distribution, which is on a weight basis, is typical of distributions found by analysis of particles withdrawn from the chlorination reactor after this steady state had been reached:

| | Percent |
|---|---|
| −44 +60 mesh, B.S.S. | 23.1 |
| −60 +72 mesh, B.S.S. | 25.6 |
| −72 +100 mesh, B.S.S. | 42.5 |
| −100 mesh, B.S.S. | 8.8 |

In the steady state, titanium dioxide particles were withdrawn from the oxidation reactor and introduced into the chlorination reactor at a rate of 11.3 pounds per hour. At the same time, titanium dioxide particles of reduced size were withdrawn from the chlorination reactor and introduced into the oxidation reactor at a rate of 2.97 pounds per hour.

The effluent from the chlorination reactor, all of which was introduced into the oxidation reactor, had the following analysis:

| | Pounds per hour |
|---|---|
| Titanium dioxide particles | 0.33 |
| Titanium tetrachloride | 19.0 |
| Carbon dioxide | 8.8 |
| Carbon monoxide | 5.6 |
| Chlorine | 0.7 |
| Nitrogen | 35.0 |

The effluent from the oxidation reactor had the following analysis:

| | Pounds per hour |
|---|---|
| Titanium dioxide | 24.0 |
| Chlorine | 56.7 |
| Carbon dioxide | 23.4 |
| Nitrogen | 43.0 |
| Oxygen | 7.0 |

*Example 2*

This example was carried out using a reactor as shown in the accompanying drawings, in which.

Figure 1:
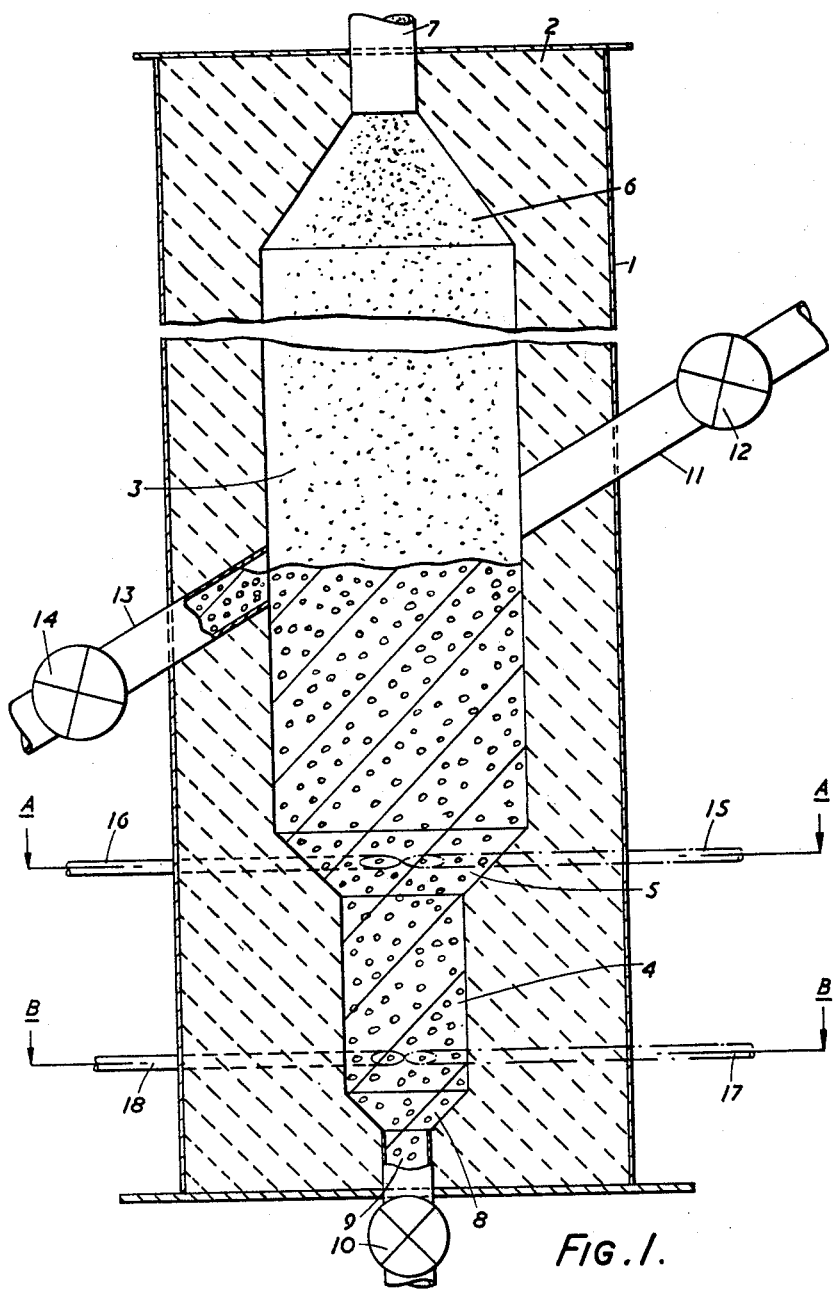
FIGURE 1 is an axial section of the reactor.

Referring to the drawings, the reactor comprises a cylindrical steel shell 1 fitted with a refractory lining 2. The refractory lining 2 is shaped so that the upper part 3 of the interior of the reactor has a diameter of eight inches and the lower part 4 of the interior of the reactor has a diameter of four inches and is six inches high. A short frusto-conical portion 5 leads from the upper part 3 to the lower part 4 of the interior of the reactor. At the upper end of the upper part 3, a frusto-conical portion 6 leads to an outlet pipe 7. At the lower end of the lower part 4, a frusto-conical portion 8 leads to a solids-removal pipe 9 fitted with a valve 10.

An inclined solids supply pipe 11 fitted with a valve 12 enables solid material to be introduced into the upper part 3 of the interior of the reactor and an inclined solids offtake pipe 13 fitted with a valve 14 enables solids to be withdrawn from the upper part 3 of the interior of the reactor.

Figure 2:
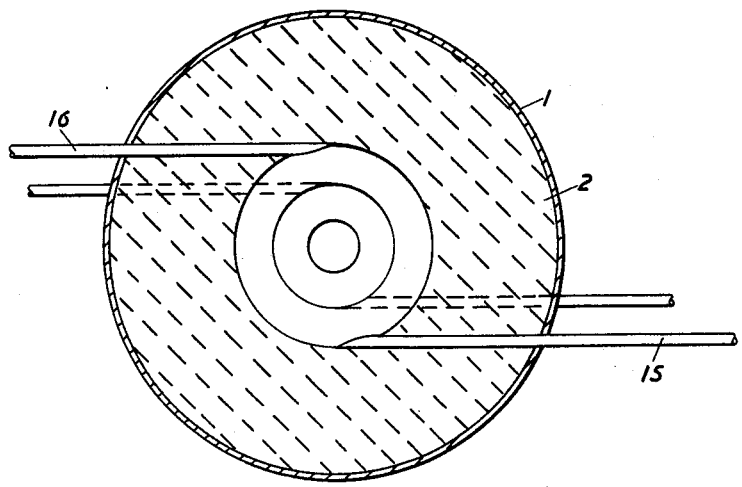
FIGURE 2 is a section taken on the line A—A of FIGURE 1.
Figure 3:
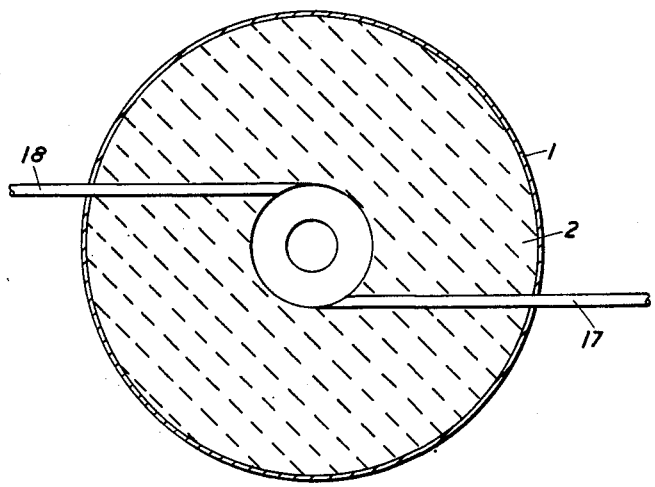
FIGURE 3 is a section taken on the line B—B of FIGURE 1.

Two upper horizontal tangentially directed gas inlet pipes 15 and 16 (see FIGURE 2) enable gas to be introduced into the short frusto-conical portion 5 of the interior of the reactor, and two lower-horizontal tangentially directed gas inlet pipes 17 and 18 (see FIGURE 3) enable gas to be introduced into the lower part 4 of the interior of the reactor.

50 pounds of titanium dioxide particles having a size range of −44 +80 mesh (B.S.S.) were withdrawn from a fluidized bed in which titanium dioxide was being produced by the oxidation of titanium tetrachloride. The titanium dioxide, which was of a dense form with an apparent density of 2.2, was introduced into the upper part 3 of the reactor shown in the drawings through the solids-supply pipe 11.

The titanium dioxide particles formed a bed which had a height, when static, of eighteen inches and thus extended into the upper part 3 of the interior of the reactor.

Oxygen was introduced into the lower part 4 through the gas inlet pipe 18 at a rate sufficient to fluidize the whole of the bed. At the same time, a fuel gas was introduced through the gas inlet pipe 17 and burned within the interior of the reactor until the temperature of the bed and the inner surface of the refractory lining 2 reached 1,200° C. The supply of fuel gas and oxygen was then cut off and the portion of the bed situated within the upper part 3 of the interior of the reactor was fluidized by passing titanium tetrachloride vapor, oxygen and nitrogen upwardly through this portion of the bed at the following rates:

| | Pounds per hour |
|---|---|
| Titanium tetrachloride vapor | 56.0 |
| Oxygen | 25.0 |
| Nitrogen | 8.0 |

The titanium tetrachloride vapor was introduced through the gas inlet pipe 16 and the oxygen was introduced through the gas inlet pipe 15. A part of the nitrogen, which was intended to serve as a diluent, was introduced into the reactor in admixture with the titanium tetrachloride vapor and the remainder was introduced in admixture with the oxygen.

At the same time, the oxide particles forming the portion of the bed within the lower part 4 of the interior of the reactor were chlorinated by introducing carbon monoxide through the gas inlet pipe 17 and chlorine through the gas inlet pipe 18 at the following rates:

|  | Pounds per hour |
|---|---|
| Carbon monoxide | 11.2 |
| Chlorine | 14.9 |

It will be noted that the tangentially directed gas inlet pipes 15, 16, 17 and 18 are all so directed that the gases entering through them all tend to impart a swirling movement to the particles forming the bed in the same sense.

The titanium tetrachloride was substantially completely converted to titanium dioxide, which was produced at a rate of about 24 pounds per hour and consisted of finely divided material of pigment quality that was carried out of the reaction vessel in suspension in the gas stream flowing through the outlet pipe 7.

The process was continued for approximately 6 hours and during this period the level of the bed remained approximately constant.

The solids offtake pipe 13 was provided to enable the temperature of the oxidation bed to be controlled by withdrawing particles from the bed, cooling the particles and then returning the cooled particles to the reactor through the solids supply pipe 11, but it did not prove to be necessary to do this.

I claim:

1. In the process for producing titanium dioxide by reacting in the vapor phase titanium tetrachloride and an oxidizing gas in an oxidation zone comprising a bed of solid titanium dioxide particles of predetermined size maintained in a fluidized condition at a temperature within the range of 750° C. to 1500° C. wherein a portion of the titanium dioxide produced is carried away in the gas stream leaving the oxidation zone in the desired finely divided form and another portion remains in the bed as a deposit forming large particles in the bed, the improvements which comprise continuously controlling the size distribution of the particles forming the bed and converting substantially all of the titanium tetrachloride vapor into titanium dioxide of the desired finely divided form by:

(1) continuously withdrawing a portion of the large particles from the bed, (2) continuously reacting the withdrawn particles in a chlorination zone with a gaseous chlorinating agent and a gaseous reducing agent selected from the group consisting of carbonyl chloride and a mixture of chlorine and carbon monoxide in amounts sufficient to reduce the size of the particles and release titanium tetrachloride therefrom, and (3) continuously returning the particles of reduced size and said released titanium tetrachloride vapor from the chlorination zone to the bed in the oxidation zone to again undergo reaction to form said desired finely divided titanium dioxide particles and utilize in said oxidation zone substantially all of the titanium tetrachloride originally introduced.

2. A process as claimed in claim 1 wherein the oxidation and chlorination zones are situated in different reactors.

3. A process as claimed in claim 1 wherein the large titanium dioxide particles are withdrawn from the oxidation zone by allowing them to fall through the bottom of the oxidation zone against the fluidizing gas stream by reason of their greater size.

4. A process as claimed in claim 1 wherein the oxidation and chlorination zones are different zones of the same reactor.

5. A process as claimed in claim 4 wherein the chlorinating and reducing agent is introduced into the reactor substantially at the base thereof, the titanium tetrachloride and the oxidizing gas are introduced into the reactor at a higher level, the horizontal cross-sectional area of the reactor increases upwardly above the said higher level, and the rate of feed of substances to the reactor and the dimensions of the reactor are so selected that oxide particles are maintained in the form of a fluidized bed in which the chloride undergoes oxidation in a high zone of the reactor, oxide particles that have grown above a certain size fall towards the base of the reactor into a lower zone where they undergo partial chlorination, and the resulting oxide particles of reduced size are carried up into the oxidation zone entrained in the gas stream leaving the chlorination zone.

6. A process as claimed in claim 5 wherein at least one of the oxidizing gas and the titanium tetrachloride are introduced into the reactor through inlets directed tangentially to impart a swirling motion to the oxide particles in the fluidized bed in the oxidation zone.

7. A process as claimed in claim 1 wherein the oxidizing gas is selected from the group consisting of air and oxygen.

References Cited in the file of this patent

UNITED STATES PATENTS

| 2,436,870 | Murphree | Mar. 2, 1948 |
| 2,653,078 | Lane | Sept. 22, 1953 |
| 2,642,339 | Sawyer | June 16, 1953 |
| 2,657,976 | Rowe et al. | Nov. 3, 1953 |
| 2,760,846 | Richmond et al. | Aug. 28, 1956 |
| 2,980,509 | Frey | Apr. 18, 1961 |
| 3,022,137 | Nelson | Feb. 20, 1962 |
| 3,043,657 | Hughes et al. | July 10, 1962 |